(12) United States Patent
Magri et al.

(10) Patent No.: US 10,069,364 B2
(45) Date of Patent: Sep. 4, 2018

(54) ELECTRIC MACHINE AND RELATED ASSEMBLY METHOD

(71) Applicant: MAGNETI MARELLI S.P.A., Corbetta, Milan (IT)

(72) Inventors: Marco Magri, Milan (IT); Marzio Lettich, Milan (IT); Vlad Mihai Constandachi, Milan (IT)

(73) Assignee: MAGNETI MARELLI S.P.A., Corbetta (IT)

( * ) Notice: Subject to any disclaimer, the term of this patent is extended or adjusted under 35 U.S.C. 154(b) by 316 days.

(21) Appl. No.: 14/977,092

(22) Filed: Dec. 21, 2015

(65) Prior Publication Data

US 2016/0181881 A1     Jun. 23, 2016

(30) Foreign Application Priority Data

Dec. 22, 2014   (IT) .................. 102014902318553

(51) Int. Cl.
| | |
|---|---|
| *H02K 11/00* | (2016.01) |
| *H02K 3/12* | (2006.01) |
| *H02K 3/50* | (2006.01) |
| *H02K 15/00* | (2006.01) |

(52) U.S. Cl.
CPC .............. *H02K 3/12* (2013.01); *H02K 3/50* (2013.01); *H02K 15/0081* (2013.01)

(58) Field of Classification Search
CPC ...... H02K 2203/09; H02K 5/225; H02K 3/50; H02K 3/38; H02K 3/12; H02K 3/32
USPC .... 310/71, 201, 208, 184, 194, 179–180, 43
See application file for complete search history.

(56) References Cited

U.S. PATENT DOCUMENTS

| | | | | |
|---|---|---|---|---|
| 2005/0088049 | A1* | 4/2005 | De Filippis | H02K 3/522 310/71 |
| 2007/0080592 | A1* | 4/2007 | Ohta | H02K 1/148 310/71 |
| 2010/0060090 | A1* | 3/2010 | Sakata | H02K 3/522 310/71 |
| 2011/0068647 | A1* | 3/2011 | Sakaue | H02K 3/28 310/71 |

(Continued)

FOREIGN PATENT DOCUMENTS

| | | |
|---|---|---|
| EP | 2557665 A1 | 2/2013 |
| WO | 2011108734 A1 | 9/2011 |
| WO | 2013076442 A2 | 5/2013 |

*Primary Examiner* — Thanh Lam
(74) *Attorney, Agent, or Firm* — Howard & Howard Attorneys PLLC (57) ABSTRACT

An electric machine comprising a stator including at least one stator winding elements that extends from a first to a second end, separate from each other; at least one electrical bridge suitable to electrically connect the separate ends of said stator winding element; at least a support and attachment plate made of electrically insulating material which defines at least one seat suitable to house at least partially, and retain in position, the electrical bridge. The seat is provided with attachment mechanisms which form at least partially a shaped coupling with the at least one electrical bridge, so as to mechanically lock it in position on the support and attachment plate. The seat allows the passage of the ends of the stator winding element and the electrical connection between the latter and the electrical bridge. The seat electrically insulates the electrical bridge from other components of the stator.

19 Claims, 6 Drawing Sheets

(56) References Cited

U.S. PATENT DOCUMENTS

2011/0175471 A1\* 7/2011 Marchitto ............. H02K 3/521
310/71
2012/0112582 A1\* 5/2012 Kim .................... B62D 5/0403
310/71
2013/0038146 A1 2/2013 Hoffman et al.

\* cited by examiner

ELECTRIC MACHINE AND RELATED ASSEMBLY METHOD

CROSS-REFERENCE TO RELATED APPLICATIONS

The present application claims priority to and all the benefits of Italian Patent Application No. 102014902318553, filed on Dec. 22, 2014, which is hereby expressly incorporated herein by reference in its entirety.

BACKGROUND OF THE INVENTION

1. Field of the Invention

This invention relates to an electric machine and its method of assembly.

2. Description of the Related Art

As is known, electric machines, whether motors or generators, comprise a rotor and a stator that rotates relative to the stator.

The stator can be of various types and, in particular, can be of the bar type, in which the conductors comprise a plurality of bars bent in a "U" so as to have two free ends, i.e., the ends of the branches of said bars bent in a "U". These free ends must be electrically connected so as to close the windings and, some of them, are welded to related plates made of conductive material, typically copper, which act as electrical bridges; the remaining free ends are welded to each other in sequence.

These bridges serve to obtain the proper connections between the different phases of the windings, so as to allow the electrical connection to an external power supply. The steps of assembling the electrical bridges and the ends of the conductive bars must be performed with extreme precision and care. In current solutions of the known art, these operations are not automated, but are performed substantially by hand, the work of specialised personnel. These assembly operations are particularly slow and therefore costly, because they cannot be automated.

SUMMARY OF THE INVENTION

Therefore, there is a need to solve the drawbacks and limitations mentioned in reference to the prior art.

Therefore, there is a need to make the assembly of stators of electric machines faster and more economical, with particular reference to electrical bridges. This need is met by an electric machine and by an assembly method of the present invention. More specifically, the electric machine includes a stator comprising at least two stator winding elements each of which extends from a first to a second end, separate from each other, at least one electrical bridge suitable to electrically connect the separate ends belonging to the two different, aforementioned stator winding elements. At least a support and attachment plate is made of electrically insulating material which defines at least one seat suitable to house at least partially, and retain in position, the electrical bridge. The seat is provided with attachment mechanisms which form at least partially a shaped coupling with the at least one electrical bridge, so as to mechanically lock it in position on the support and attachment plate. The seat allows the passage of the ends of the stator winding element and the electrical connection between the latter and the electrical bridge. The seat electrically insulates the electrical bridge from other components of the stator.

The method of making and assembling an electric machine includes the steps of providing at least two stator winding elements which extend from a first to a second end, separate from each other, and providing at least one electrical bridge suitable to electrically connect the separate ends of two different stator winding elements. A support and attachment plate made of electrically insulating material is provided which defines at least one seat suitable to house at least partially, and retain in position the electrical bridge. The seat includes an attachment mechanism. The electrical bridge is pre-assembled in the respective seat using the attachment mechanism, so as to mechanically lock it in position on the support and attachment plate. The method also includes mechanically and electrically connecting the ends of the electric winding to the respective electric bridge.

Other objects, features and advantages of the present invention will be readily appreciated as the same becomes better understood after reading the subsequent description taken in connection with the accompanying drawings

DETAILED DESCRIPTION OF THE INVENTION

Figure 1:
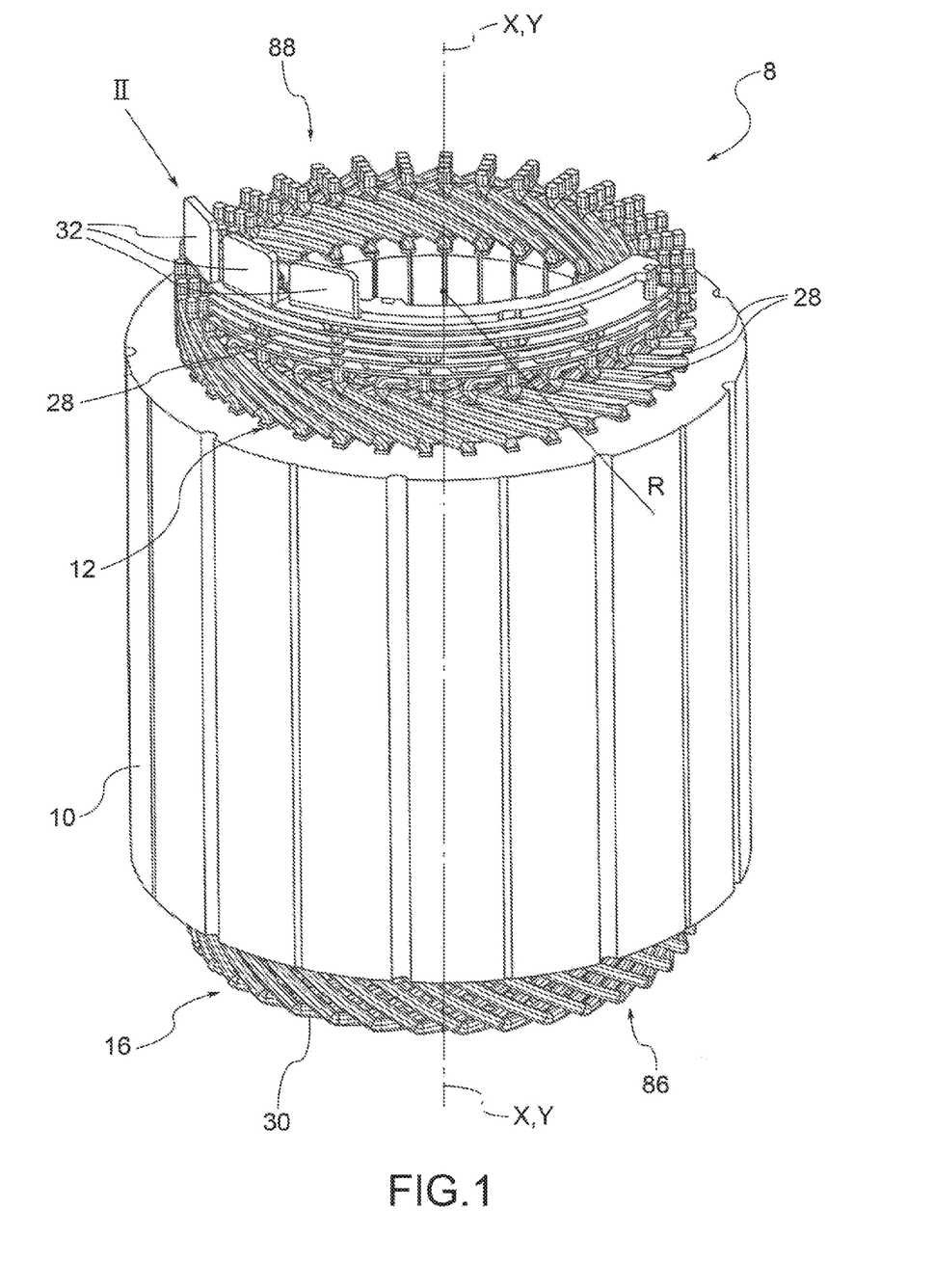
FIG. 1 is a schematic perspective view of a stator of an electric machine according to an embodiment of this invention.
Figure 2A:
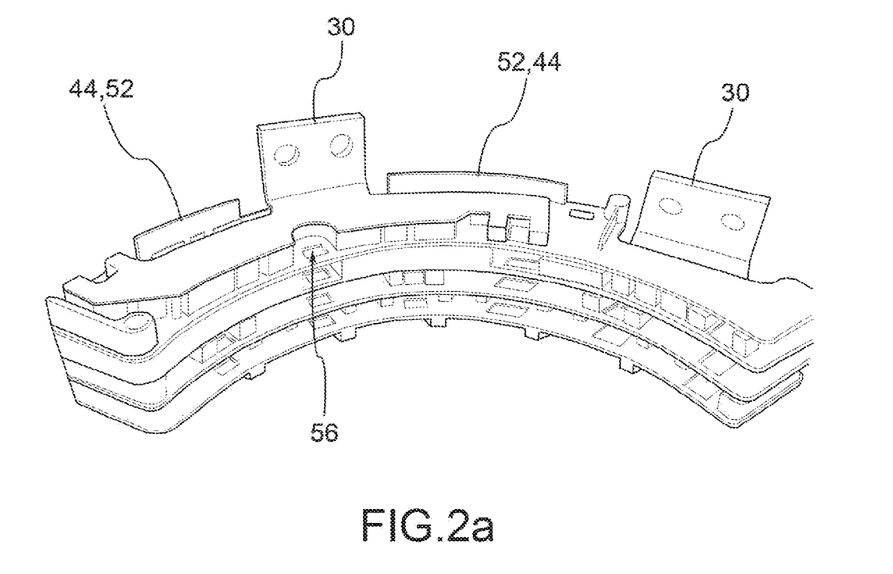
FIG. 2a is a perspective view, from one angle, of detail II of FIG. 1.
Figure 2B:
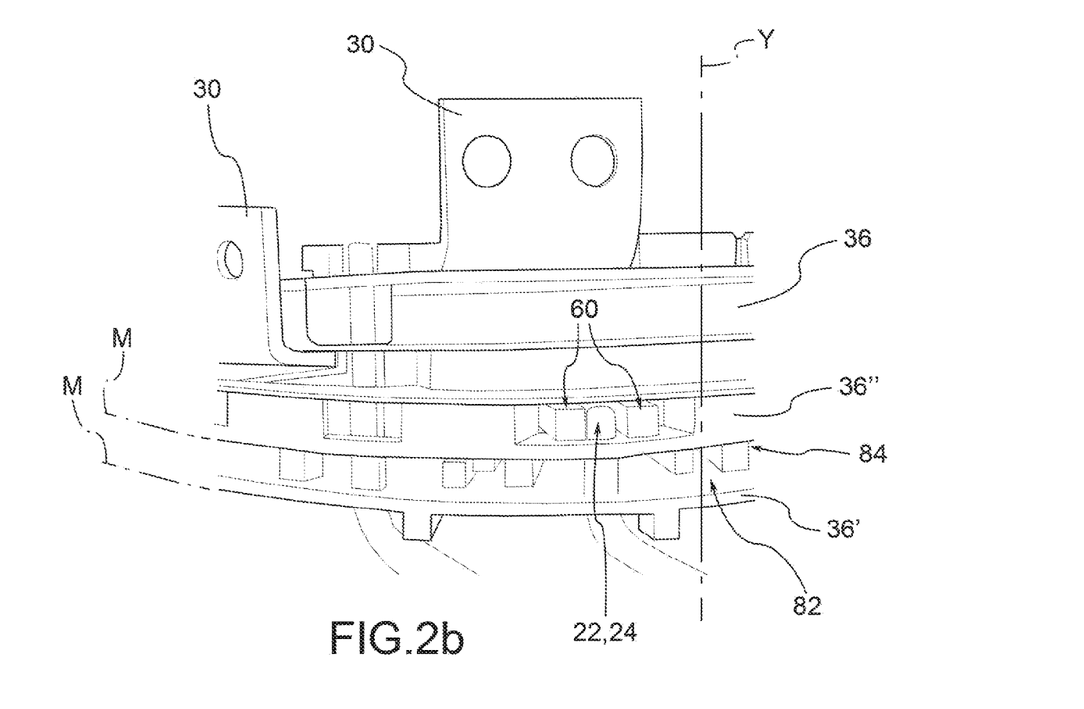
FIG. 2b is a perspective view, from another angle, of detail II of FIG. 1.
Figure 3:
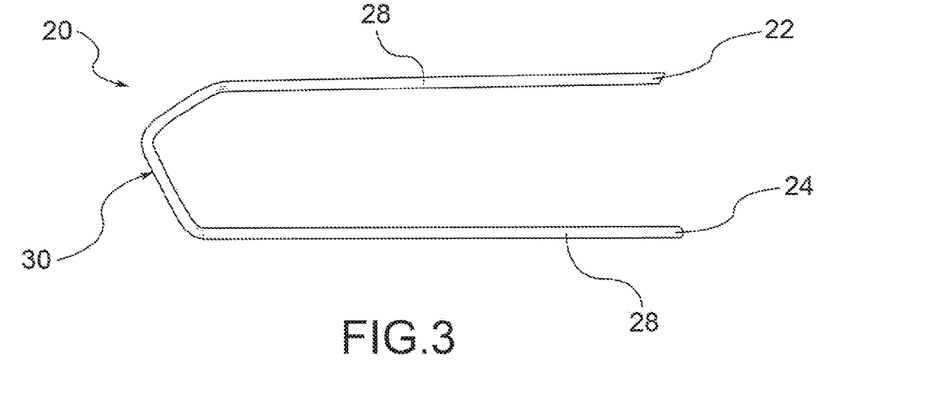
FIG. 3 is a view of various components of an electric machine stator according to this invention.
Figure 4:
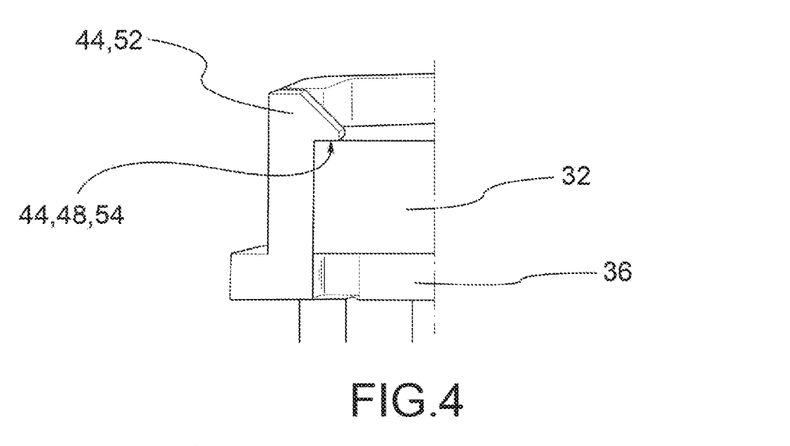
FIG. 4 is another view of various components of an electric machine stator according to this invention.
Figure 5:
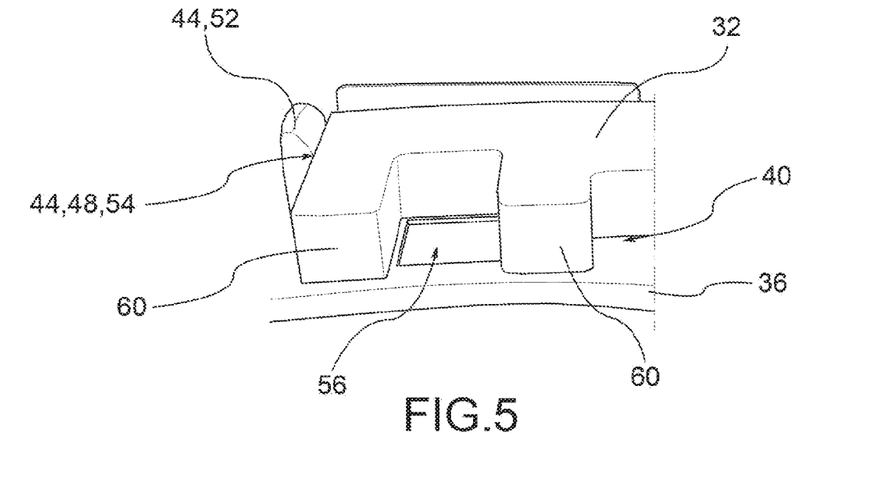
FIG. 5 is another view of various components of an electric machine stator according to this invention.
Figure 6:
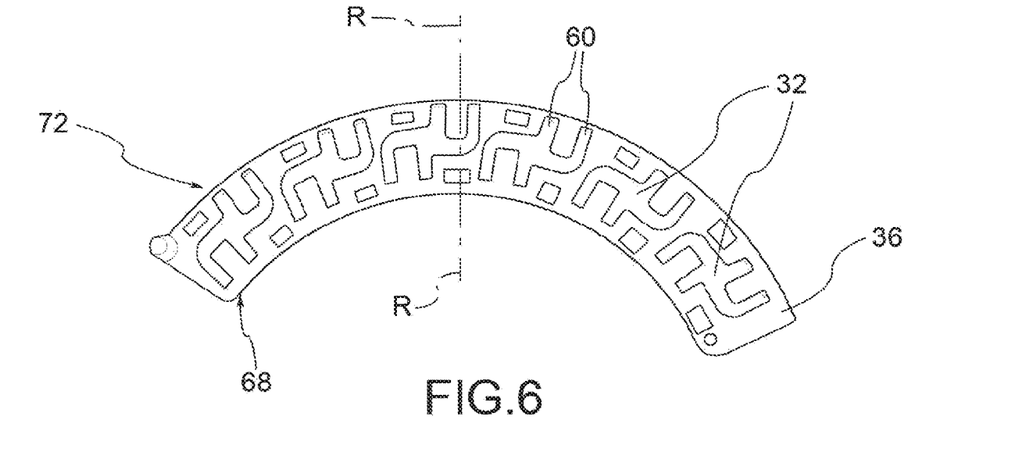
FIG. 6 is another view of various components of an electric machine stator according to this invention.
Figure 7:
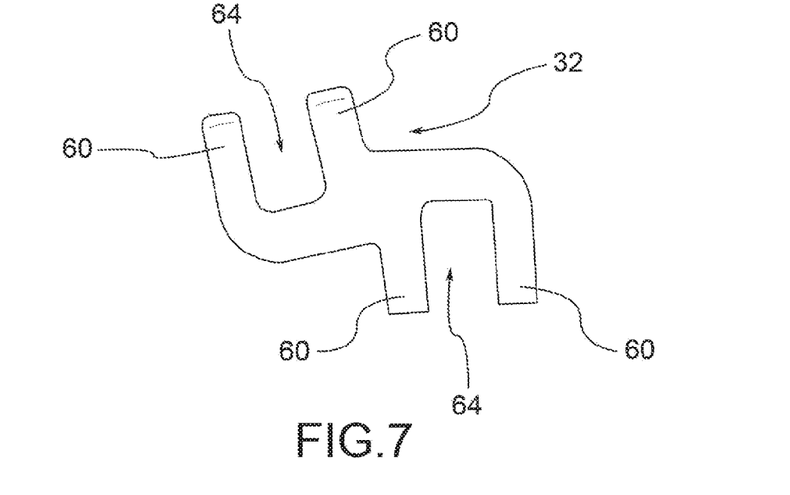
FIG. 7 is another view of various components of an electric machine stator according to this invention.
Figure 8:
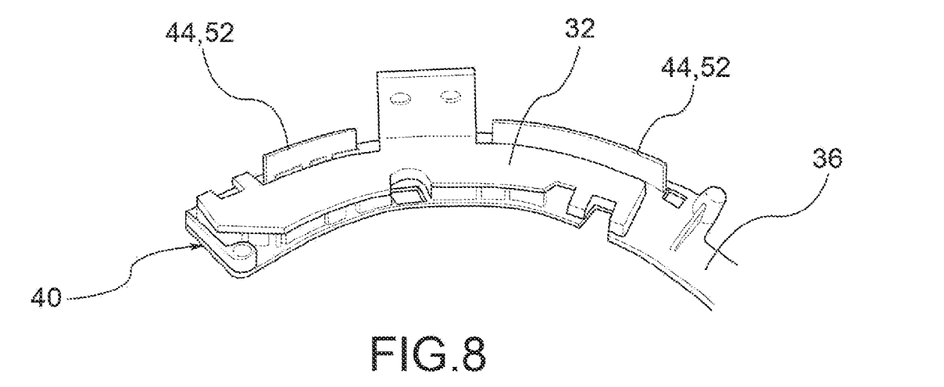
FIG. 8 is another view of various components of an electric machine stator according to this invention.
Figure 9:
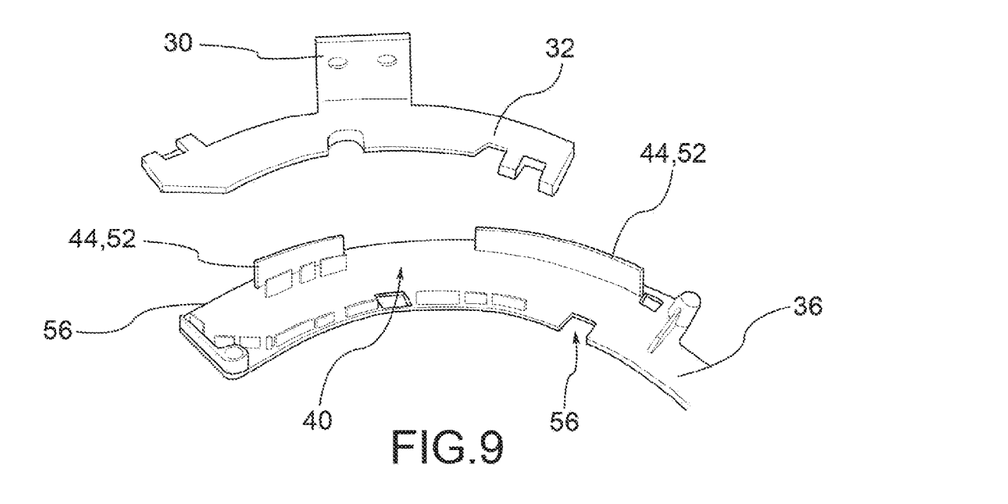
FIG. 9 is another view of various components of an electric machine stator according to this invention.
Figure 10:
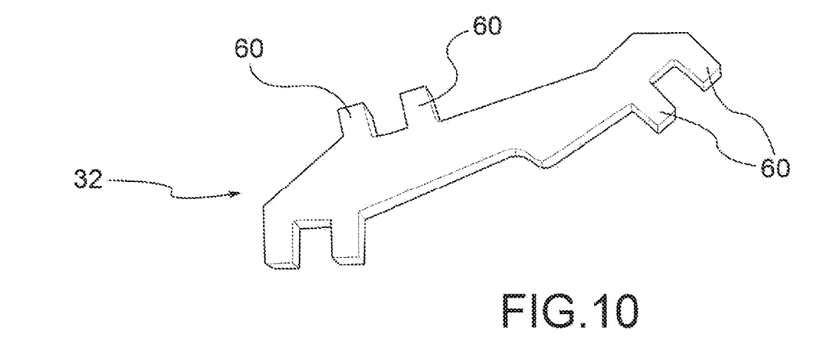
FIG. 10 is another view of various components of an electric machine stator according to this invention.
Figure 11:
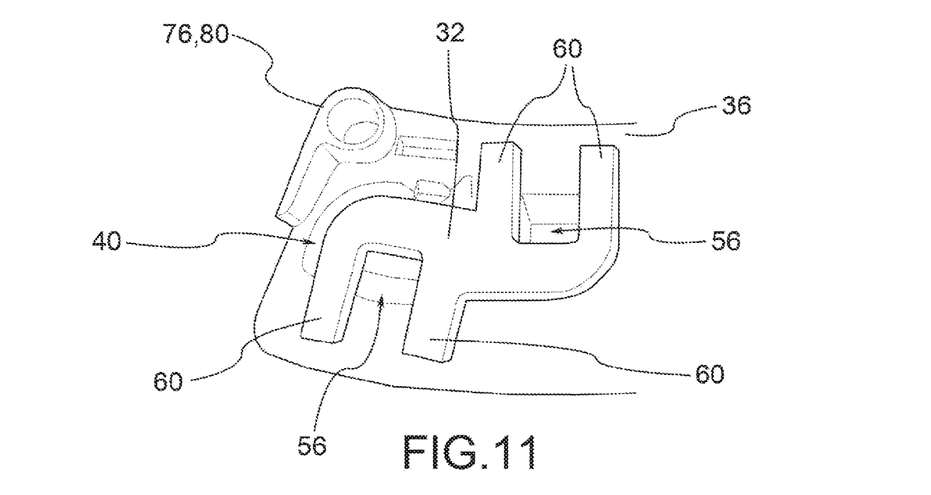
FIG. 11 is another view of various components of an electric machine stator according to this invention.
Figure 12:
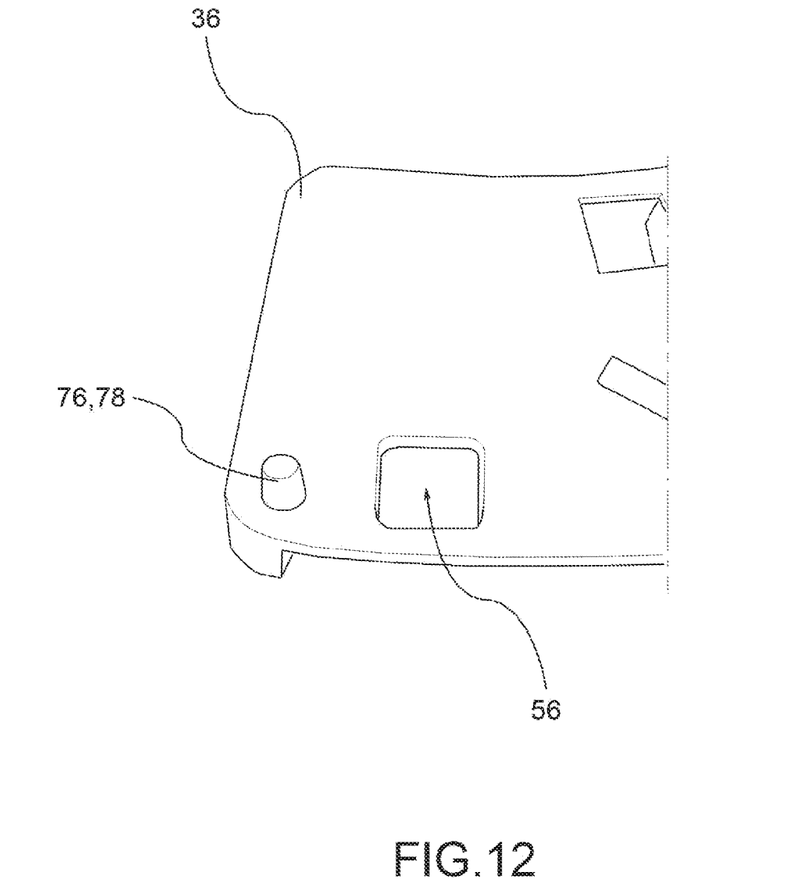
FIG. 12 is another a view of various components of an electric machine stator according to this invention.

As mentioned above, this invention refers to the construction/assembly of parts of electric machines. The members, or parts of members, in common between the embodiments described below will be indicated with the same reference numbers.

The specific type of electric machine is not relevant for the purposes of the scope of protection of this invention. In other words, this invention refers to any electric machine that can function either as a motor or electric generator, in a known manner.

The electric machine is provided with at least one stator 8 and a rotor not shown. For example, the stator 8 comprises a magnetic core 10, comprising a series of pack-tightened plates and has a centrally perforated shape. The magnetic core 10 may comprise a plurality of slots 12 that house a stator winding 16.

For example, the stator winding 16 is a three-phase stator winding distributed in a plurality of slots 12 of the stator 8. The stator winding 16 comprises a plurality of stator winding elements 20 each of which extends from a first to a second end 22,24, separate from each other. The number of stator winding elements 20 is variable as a function of the type of electric machine to be made. For example, the stator winding elements 20 can be bar-shaped, of different section and size, bent so as to assume an overall "U"-configuration, having two branches 28 that, on the one side terminate in said first and second ends 22,24 separate from each other and, on the other, are connected in a curved portion or knee 30. The stator winding elements 20 are inserted into the slots 12 of the magnetic core 10.

The stator winding 16 comprises for example a plurality of connection terminals 30 that constitute the electrical interface with the outside of the stator winding 16 and are connected electrically to an electronic power converter (not shown) that drives the electric machine.

The stator 8 includes at least one electrical bridge 32 suitable to electrically connect the separate ends 22,24 of two different stator winding elements 20. The stator 8 also includes at least one support and attachment plate 36 made of electrically insulating material which defines at least one seat 40 suitable to house at least partially, and retain in position, the electrical bridge 32. For example, the support and attachment plate 36 may be made of electrically-insulating plastic. The support and attachment plate 36 is a rigid element which constitutes a rigid support for the positioning and attachment of the relative electrical bridges 32 in the stator 8.

The seat 40 is provided with an attachment mechanism 44 which form at least partially a shaped coupling with the at least one electrical bridge 32, so as to mechanically lock it in position on the support and attachment plate 36. Said seat 40 also allows the passage of the ends 22,24 of one or more stator winding elements 20 and the electrical connection between these 22,24 and the electrical bridge 32. In addition, the seat 40 electrically isolates the electrical bridge 32 from other components of the stator 8, obviously except for the corresponding stator winding elements 20 connected to said electrical bridge. According to an embodiment, the attachment mechanism 44 are shaped so as to form a snap-fit shaped coupling with the electrical bridge 32.

For example, the attachment mechanism 44 create a locking of the electrical bridge 32 by use of at least one undercut 48 in a direction perpendicular to a median extension plane M of said support and attachment plate 36.

According to one embodiment, the attachment mechanism 44 comprise flexible tabs 52 having at least one tooth 54 that forms an undercut 48 in abutment against a portion of the electrical bridge, to secure it in position on the support and attachment plate 36.

Preferably, the attachment mechanism 44 is in turn made of electrically insulating material, and in one embodiment the attachment mechanism is an integral part of the plate 36 itself.

According to one embodiment, the support and attachment plate 36 includes at least one through hole 56 which intercepts the housing seat 40 of the electric bridge 32, so as to allow the passage of one end 22,24 of the stator winding element 20 and its mechanical and electrical connection with the electrical bridge 32.

According to another possible embodiment, the electrical bridge 32 includes at least a pair of connectors 60 defining a housing space 64 which receives the ends 22,24 of the stator winding element 20 to be connected electrically to the bridge 32 itself, wherein the connectors 60 constitute attachment elements for the ends 22,24 of the stator winding element 22. For example, the connectors 60 form a snap-fit shaped coupling with the ends 22,24 of the stator winding element 20 and/or a support for a welding of said ends 22,24.

According to another possible embodiment, the support and attachment plate 36 includes at least one through hole 56 aligned with the housing space 64 delimited by the connectors 60, for the passage of the ends 22,24 of the stator winding element 20 to be connected mechanically and electrically to the electrical bridge 32.

According to one embodiment, the connectors 60 extend as far as an inner 68 or outer 72 radial edge of the support and attachment plate 36, in a radial direction R perpendicular and incident with a rotation axis X-X of the associable rotor, so as to be accessible respectively from an inner side, facing the rotation axis X-X, or from an outer side, opposite the inner side, and to allow the positioning of automatic attachment and/or welding devices for attaching the ends 22,24 of the stator winding 20 to the electrical bridge 32.

In one embodiment, each support and attachment plate 36 includes a plurality of seats 40, each seat 40 houses a corresponding electrical bridge 32 attached to the support and attachment plate 36 by use of relative attachment mechanism 44 and each electrical bridge 32 is electrically separate from the other bridges attached to the same support and attachment plate 36.

In addition, the stator 8 includes a plurality, i.e., at least two support and attachment plates 36, for example one lower 36' and one upper 36", reciprocally superposed in an axial direction Y-Y, parallel to said rotation axis X-X, wherein between said superposed support and attachment plates 36',36") electrically insulating spacers 76 are present to space the support and attachment plates 36',36" by a distance such as to allow the housing of the respective electrical bridges 32.

For example, the spacer elements 76 include a protuberance 78 and a corresponding recess 80, suitable to receive said protuberance 78, arranged between an upper wall 82 of the bottom plate 36' and a lower wall 84 of the upper plate 36", mutually facing each other.

In one embodiment, the spacer elements 76 are shaped so as to block between them two support and attachment plates 36',36" adjacent in an axial direction Y-Y, both parallel to the axial direction Y-Y and to a plane perpendicular to the axial direction Y-Y.

Now the method of assembling an electric machine according to this invention will be described. The steps described below can also be executed in a different order than that described without thereby departing from the scope of protection of this invention. For example, the method includes the steps of:

providing at least two stator winding elements 20 which extend from a first to a second end 22,24, separate from each other, providing at least one electrical bridge 32 suitable to electrically connect the separate ends 22,24 of two of said stator winding elements 20, providing at least one support and attachment plate 36 made of electrically insulating material which defines at least one seat 40 suitable to house at least partially, and retain in position the electrical bridge 32, the seat 40 being provided with an attachment mechanism 44.

Then the step of pre-assembling the electrical bridge 32 in the respective seat 40 is carried out using the attachment mechanism 44, so as to mechanically lock it in position on the support and attachment plate 36 and the ends 22,24 of the stator winding elements 20 are mechanically and electrically connected to the respective electrical bridge 32.

This connection may be mechanical, for example by use of interlocking attachment mechanisms and/or by welding.

Preferably, the method involves pre-assembling a plurality of electrical bridges 32, by use of respective attachment mechanisms 44, on respective support and attachment plates 36 superposed with each other.

Then the ends 22,24 of related stator winding elements 20 are mechanically and electrically connected to respective electrical bridges 32 according to a predetermined wiring diagram. For example, the insertion of the stator winding elements in the pack of superposed support and attachment plates can take place by inserting the ends 22,24 from an input side 86 of the core 10 to bring them in correspondence with an output side 88 of the same core, along the slots 12 of the magnetic core.

On the output side 88, the ends 22,24 are inserted in correspondence of the through holes 56 of the support and attachment plates 36 so as to intercept the connectors 60 of the respective electrical bridges.

The attachment of the ends 22,24 to the connectors can be performed automatically by use of crimping machines/heads and/or welding that secure/weld the ends 22,24 to the connectors 60. This operation is facilitated by the fact that the connectors 60 and the housing spaces 64 delimited by these extend up to the respective inner and outer radial edges 68,72 of the support and attachment plates 36. In this way, the connectors 60 and the ends 22,24 are easily accessible by the automatic machines that carry out the mechanical/electric attachment.

All the construction/assembly operations described above can be automated so as to limit as much as possible the manual intervention of the operator and to reduce the cost and time of assembly of the stators of the electrical machines. As can be appreciated from the description, this invention allows overcoming the drawbacks presented in the prior art.

In fact, the invention described allows implementing the isolation between the different layers of the windings of the stators of electric machines using support and attachment plates made of electrically insulating material that allow simple handling and assembly by use of automatic machines.

In addition, the support and attachment plates made of insulating material according to the invention hold the electrical bridges in position through interlocking tabs that prevent any movement of the latter, which remain constrained to the respective plate by the undercut of the tabs. In this way, one obtains automatic attachment of the electrical bridges without requiring the manual intervention of an operator.

Moreover, the support and attachment plates are made in a manner that facilitates their correct "stacking" through for example spacers placed between two support and attachment plates superposed and contiguous with each other; the mechanical connection between the pin/protuberance of one plate and the recess/seat of another superposed plate allows having a mechanical attachment between the plates that facilitates the assembly steps through the use of automatic lines.

The solution according to the invention allows the manipulation and assembly of electrical bridges using an automatic machine, thus facilitating the assembly of the machine itself, and reducing the time and cost of assembly of the stators of electric machines.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. An electric machine comprising a stator comprising:
    at least two stator winding elements each of which extends from a first to a second end, separate from each other,
    at least one electrical bridge suitable to electrically connect the separate ends belonging to the two different, aforementioned stator winding elements,
    at least a support and attachment plate made of electrically insulating material which defines at least one seat suitable to house at least partially, and retain in position, the electrical bridge,
    the seat being provided with attachment mechanisms which form at least partially a shaped coupling with the at least one electrical bridge, so as to mechanically lock it in position on the support and attachment plate,
    said seat allowing the passage of the ends of the stator winding element and the electrical connection between the latter and the electrical bridge,
    the seat electrically insulating the electrical bridge from other components of the stator.

2. The electric machine as set forth in claim 1, wherein the support and attachment plate is a rigid element which constitutes a rigid support for the positioning and attachment of the relative electrical bridges in the stator.

3. The electric machine as set forth in claim 1, wherein the attachment mechanisms are shaped so as to form a snap-fit shaped coupling with the electrical bridge.

4. The electric machine as set forth in claim 1, wherein the attachment mechanisms create a locking of the electrical bridge by use of at least one undercut in a direction perpendicular to a median extension plane of said support and attachment plate.

5. The electric machine as set forth in claim 1, wherein said attachment mechanisms comprise flexible tabs having at least one tooth that forms an undercut in abutment against a portion of the electrical bridge, to secure it in position on the support and attachment plate.

6. The electric machine as set forth in claim 1, wherein the attachment mechanisms are made of electrically insulating material.

7. The electric machine as set forth in claim 1, wherein the support and attachment plate comprises at least one through hole which intercepts the housing seat of the electric bridge, so as to allow the passage of one end of the stator winding element and its mechanical and electrical connection with the electrical bridge.

8. The electric machine as set forth in claim 1, wherein the electrical bridge comprises at least a pair of connectors defining a housing space which receives the ends of the stator winding element to be connected electrically to said bridge, wherein the connectors constitute attachment elements for the ends of the stator winding element.

9. The electric machine as set forth in claim 8, wherein said connectors form a snap-fit shaped coupling with the ends of the stator winding element and/or a support for a welding of said ends.

10. The electric machine as set forth in claim 8, wherein the support and attachment plate comprises at least one through hole aligned with the housing space delimited by the connectors, for the passage of the ends of the stator winding element to be connected mechanically and electrically to the electrical bridge.

11. The electric machine as set forth in claim 8, wherein said connectors extend as far as an inner or outer radial edge of the support and attachment plate, in a radial direction perpendicular and incident with a rotation axis of the associable rotor, so as to be accessible respectively from an inner side, facing the rotation axis, or from an outer side, opposite the inner side, and to allow the positioning of automatic attachment and/or welding devices for attaching the ends of the stator winding to the electrical bridge.

12. The electric machine as set forth in claim 1, wherein each support and attachment plate comprises a plurality of seats, each seat housing a corresponding electrical bridge attached to the plate by relative attachment mechanisms, each electrical bridge being electrically separate from the other electrical bridges attached to the same plate.

13. The electric machine as set forth in claim 1, comprising at least two support and attachment plates, one lower and one upper, reciprocally superposed in an axial direction, wherein between said superposed support and attachment plates electrically insulating spacers are present to space the support and attachment plates by a distance such as to allow the housing of the respective electrical bridges.

14. The electric machine as set forth in claim 13, wherein said spacer elements comprise a protuberance and a corresponding recess, suitable to receive said protuberance, arranged between an upper wall of the bottom plate and a lower wall of the upper plate, mutually facing each other.

15. The electric machine as set forth in claim 13, wherein the spacer elements are shaped so as to block between them two supporting and attachment plates adjacent in an axial direction, both parallel to the axial direction and to a plane perpendicular to the axial direction.

16. The electric machine as set forth in claim 1, wherein the support plates are made of plastic material.

17. A method of making and assembling an electric machine, comprising the steps of:
providing at least two stator winding elements which extend from a first to a second end, separate from each other,
providing at least one electrical bridge suitable to electrically connect the separate ends of two different stator winding elements,
providing at least a support and attachment plate made of electrically insulating material which defines at least one seat suitable to house at least partially, and retain in position the electrical bridge, the seat being provided with attachment mechanisms,
pre-assembling the electrical bridge in the respective seat using the attachment mechanism, so as to mechanically lock it in position on the support and attachment plate,
mechanically and electrically connecting the ends of the electric winding to the respective electric bridge.

18. The method of making and assembling an electric machine as set forth in claim 17, comprising the steps of:
pre-assembling a plurality of electrical bridges on respective support and attachment plates by relative attachment mechanisms,
mechanically and electrically connecting the ends of the relative stator winding element to respective electrical bridges as set forth in a predetermined wiring diagram.

19. The method as set forth in claim 17, wherein the electric machine is an electric machine and wherein the assembly steps of said electric machine are carried out by an automatically controlled machine.

* * * * *